United States Patent [19]

Gervais

[11] 4,317,146
[45] Feb. 23, 1982

[54] COMPACT MAGNETIC DISK STORAGE SYSTEM

[75] Inventor: William J. Gervais, Northridge, Calif.

[73] Assignee: Micropolis Corporation, Chatsworth, Calif.

[21] Appl. No.: 99,607

[22] Filed: Dec. 3, 1979

[51] Int. Cl.³ .................... G11B 5/012; G11B 5/82
[52] U.S. Cl. .................................................. 360/98
[58] Field of Search ............... 360/98, 97, 133, 135, 360/86; 310/268

[56] References Cited

U.S. PATENT DOCUMENTS

| | | | |
|---|---|---|---|
| 3,577,133 | 5/1971 | Garfein et al. | 360/97 |
| 3,740,735 | 6/1973 | Gabor | 360/97 |
| 3,786,454 | 1/1974 | Lissner et al. | 360/98 |
| 4,054,931 | 10/1977 | Bolton et al. | 360/97 |
| 4,130,845 | 12/1978 | Kulma | 360/98 |

FOREIGN PATENT DOCUMENTS

| | | | |
|---|---|---|---|
| 2023236 | 11/1971 | Fed. Rep. of Germany | 360/98 |
| 2425575 | 12/1974 | Fed. Rep. of Germany | 360/98 |

*Primary Examiner*—Alfred H. Eddleman
*Attorney, Agent, or Firm*—Poms, Smith, Lande & Rose

[57] ABSTRACT

A compact, high capacity rigid magnetic disk storage system includes three 8-inch disks in an assembly only 4⅝ inches high complete with electronics. The system includes two separate sections, a first section containing the electronics, the disk drive motor, and other similar active components, and a second "clean zone" section, separated by a central cast web or partition. Within the second clean zone area are a stack of three rigid disks, the recording heads, and arrangements for positioning the recording heads; and a special filtering circuit through which air is circulated over the surface of the disks. The air circulation and filtering arrangements within the second clean zone area of the system include a special hollow hub assembly on which the rigid disks are mounted, with the hub assembly having a series of spaced radial apertures opening both to the spaces between the disks and also to the end of the hub facing away from the motor. Air is drawn from the end of the hub through the slots and out across the surfaces of the disks through centrifugal pumping action as the hub assembly and the disks rotate. A filter assembly includes a housing which defines an ultra-clean low pressure zone which is formed as air is drawn through a filter unit located to one side of the disks. The filter housing directs the air from the filter unit and confines it to flow toward the end of the rotating hub; and the housing assembly adjacent the hub and extending over the disks is of very limited extent in the direction parallel to the axis of the hub and the disks, to minimize the additional space which is required.

16 Claims, 6 Drawing Figures

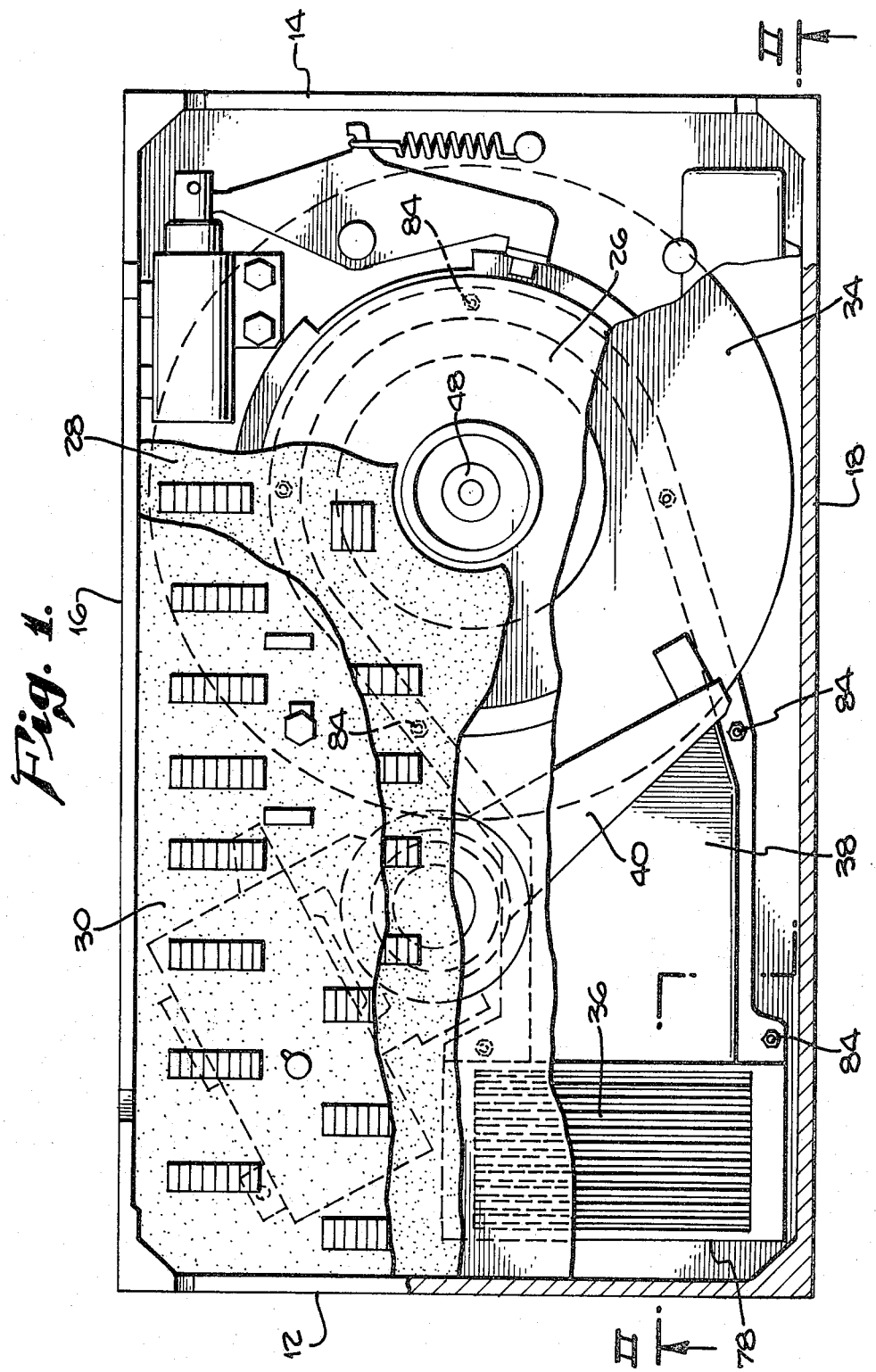

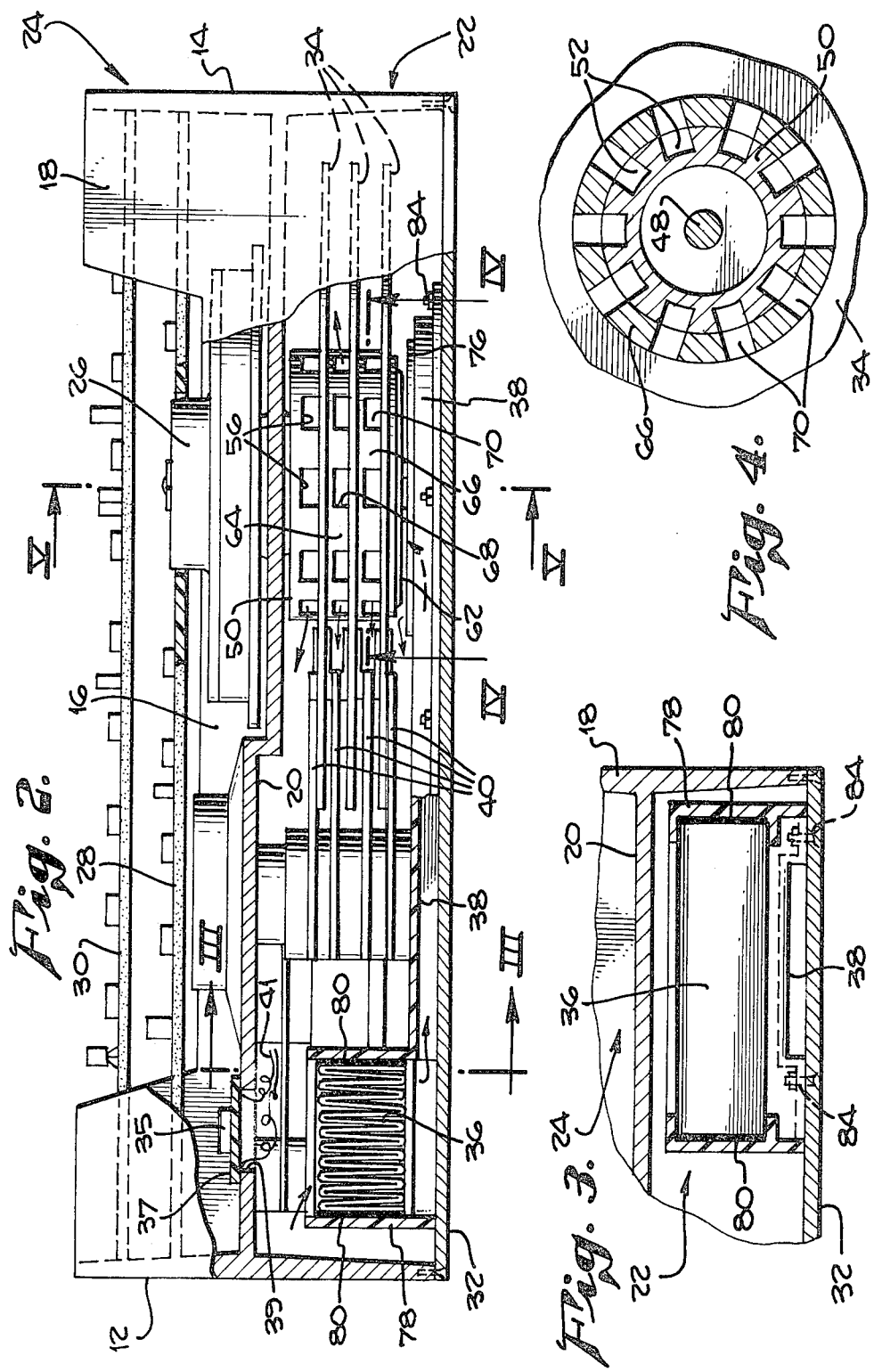

COMPACT MAGNETIC DISK STORAGE SYSTEM

FIELD OF THE INVENTION

This invention relates to compact high capacity rigid magnetic disk systems.

BACKGROUND OF THE INVENTION

In the handling of digital information the matter of storing digital information often becomes critical. For many purposes, floppy disks are an acceptable form of storage, and when more capacity than that available on a floppy disk is required, additional floppy disks may be inserted into the unit as others are removed. In addition, more than one floppy disk drive may be employed. When a greater amount of high speed random access disk storage is required, rigid disks are the next step up toward increased capacity. However, up to the present time, the 14 inch disks which have been available have been relatively costly. In addition, 14 inch fixed rigid disk drives tend to have excessive power consumption and inadequate access time, in addition to the undesirably large physical size and weight of such units.

Another problem encountered in the rigid disk storage units which have been used and proposed up to the present time, has been the problem of maintaining the surface between the disk and the recording head entirely free from dust and dirt, as very clean conditions are absolutely necessary for error-free high density recording and pick-up of digital information. In working toward this goal, various air handling arrangements have been proposed up to the present time, but these have generally been relatively elaborate and wasteful of space. Various units have employed separate blowers, special ducts in the casting for the units, etc. One other design deficiency has been the inclusion in many cases of the electronics in the same area with the disks, or soldered onto printed circuit boards, defining a part of the enclosure in which the disks are located. Accordingly, when a minor fault requires access to the printed circuit boards for replacement or the like, additional dirt and dust is introduced into the area where the disks and heads are located, thus significantly reducing the advantages which might otherwise be obtained through the use of the blower systems.

Accordingly, a principal object of the present invention is to provide a reliable high density rigid disk digital storage system. A subordinate object of the invention is to maintain the interface between the disks and the read and write heads free of dust and dirt, while concurrently reducing the overall size and capacity of the digital storage system.

SUMMARY OF THE INVENTION

In accordance with a specific illustrative embodiment of the invention, a clean environment for the rigid disk and reading heads is provided by dividing the physical deck unit into a first section in which the electronics and the motor are located, and a second "clean zone" section, separated from the first section by a central cast web or partition which also supports the main shaft interconnecting the motor and the disks. The disks and the read and write heads are located in the second clean zone. A stack of two or more rigid disks are mounted within the clean zone on a hub and spacer assembly which is provided with both radial openings to provide centrifugal pumping of air outwardly across the faces of the disks and also inlet openings to receive air from the end of the hub on its side facing away from the motor. An air filtering assembly includes a shallow duct enclosing the end of the hub through which air is drawn, and a filter located to one side of the disks, to avoid increasing the vertical height of the assembly. Air is recirculated within the clean zone section of the apparatus first through the filter, then through the duct toward the mounting hub for the rigid disks, and then out across the surfaces of the disks as a result of the centrifugal pumping action mentioned hereinabove.

It may be noted from the foregoing description that the unit initially includes a clean zone section, and within this clean zone section is a region of ultra-cleanliness developed in the low pressure region between the filter and the centrifugal pumping zone formed at the hub on which the disks are mounted. To avoid any possible particulate contamination in this region, the filter duct has a smooth flat interior surface and it includes no fasteners extending into it. Accordingly, with the filter passing only particles less than 0.3 microns in diameter, the construction assures that only the cleanest possible air is directed across the surface of the disks.

As mentioned above, all of the electronics are contained in the first section outside of the clean zone section in which the disks are mounted. This even includes the first stage amplifiers, or preamplifiers, for the heads which pick up information from the disks. A printed circuit board which forms one part of the partition between the first and second sections of the unit carries the pre-amps in sockets which are accessible from the first section for replacement without violating the integrity of the clean area, or the need for removing the boards for soldering. The components within the clean zone section or compartment are designed to have a combined mean time between failure (MTBF) of at least 25,000 hours.

By locating the filter unit to one side of the disks, a unit may be made which has substantial filter area, so that a good volume or flow of air through the filter may be obtained despite the very low diameter particles which can pass through it, which may be in the order of a few microns to a fraction of a micron. In one case, 0.3 micron filter paper was employed in an accordion pleated configuration glued into the filter cavity at the end of the filter duct.

In accordance with another subordinate aspect of the invention, the partition dividing the first and second compartments of the unit is provided with integral extensions protruding into the two compartments to support the bearings for the motor and disk shaft, and the hub on which the disks are mounted in hollow and encloses the extension which protrudes into the second compartment, thereby increasing the compactness of the unit.

In accordance with another aspect of the invention, the disks are arranged at one end of the rectangular clean zone section of the unit, and in the remaining space beyond the disks at the other end of the rectangular compartment are located the filter unit, and the head positioning voice coil and magnet assembly.

In accordance with a feature of the present invention, the entire assembly as described above including the second clean zone section containing the three eight inch disks, and the first section housing the electronics and the motor, is comparable in size to the industry standard-size, eight inch floppy disk drive. Further, the eight inch fixed rigid disk drive as described herein has more capacity than many fourteen inch rigid disk units.

Other objects, features, and advantages of the invention will become apparent from a consideration of the following detailed description and from the accompanying drawings.

BRIEF DESCRIPTION OF THE DRAWINGS

FIG. 1 is a cutaway top view of an illustrative unit taken from the side where the electronics and the motor are mounted;

FIG. 2 is a partial cross-sectional view taken along lines II—II of FIG. 1;

FIG. 3 is a cross-sectional view through the filter unit taken along lines III—III of FIG. 2;

FIG. 4 is a view taken through the hub and one of the spacer disks, along lines IV—IV of FIG. 2;

DETAILED DESCRIPTION

Figure 5:
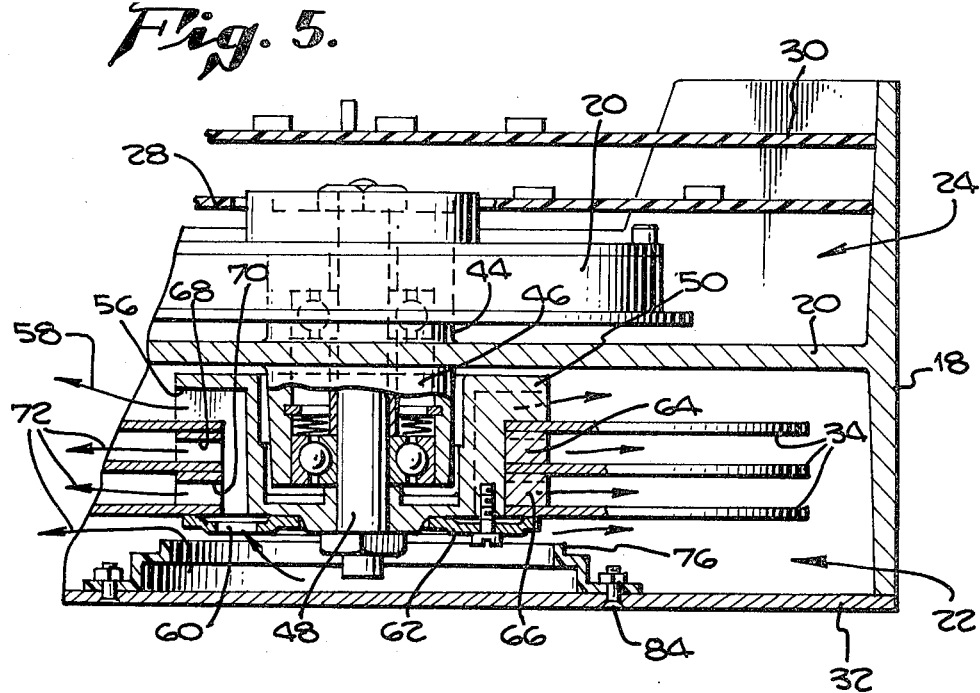
FIG. 5 is a cross-sectional view taken along lines V—V of FIG. 2 showing the air flow induced by centrifugal pumping action.

Referring more particularly to the drawings, FIGS. 1 and 2 are top and side views, respectively, of a rigid disk magnetic storage unit illustrating the principles of the invention. The main frame element of the unit is a cast aluminum member having two end walls 12 and 14, two sidewalls 16 and 18, and an intermediate web or dividing portion of the casting 20, best seen in FIG. 2. The intermediate web or partition 20 gives rigidity to the entire casting, and also serves to separate the lower or clean zone 22 from the upper portion 24 in which the motor 26 and the printed circuit boards 28 and 30 are located. Incidentally, the upper circuit board 30 includes the controller for the drive unit. A closure plate 32 tightly closes the lower end of the second or clean zone 22. Within the clean zone 22 are shown a set of three rigid magnetic storage disks 34, each having a diameter of about eight inches, an air filter unit 36, an air filtering duct 38 which directs circulating air from the filter unit 36 to the end of the hub on which disks 34 are mounted, and a magnetic reading and writing head mounting and positioning assembly 40. All components mounted within the clean zone 22 have a MTBF of at least 25,000 hours.

Incidentally, in FIG. 2, a preamplifier chip 35 is shown mounted in sockets in printed circuit board 37 tightly covering opening 39 in the partition or web 20. Leads 41 from the read/write heads are connected to the lower side of printed circuit board 37. With this arrangement no soldering on the printed circuit board 37 is required, for replacement of the preamplifier chip 315; instead, a new chip is substituted into the socket.

Figure 6:
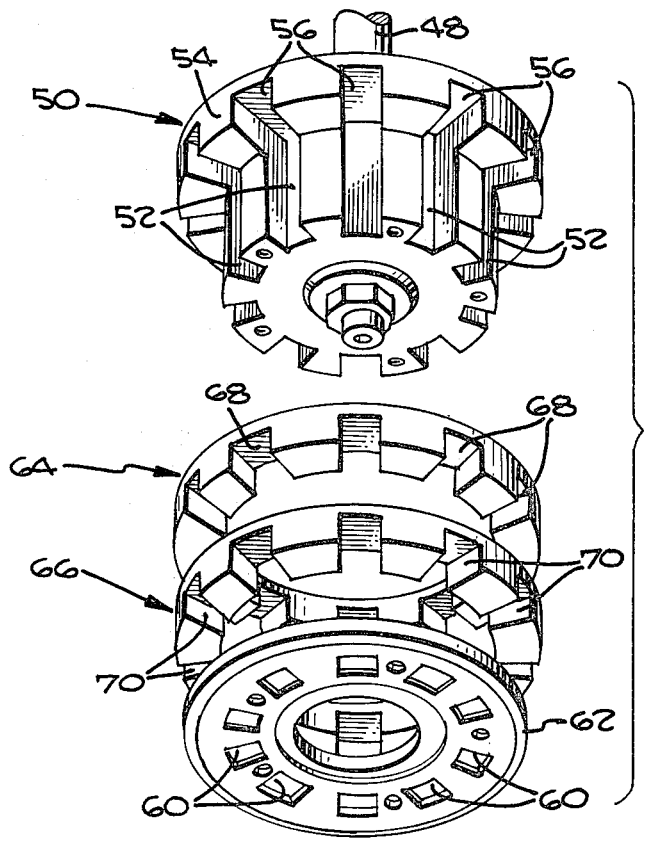
FIG. 6 is an exploded view of the hub and disk spacers together with the apertured retaining disk.

Attention will now be directed to the motor and disk assembly as shown in FIG. 5, and more particularly to the centrifugal pumping arrangements for inducing air flow which may be appreciated through a consideration of both FIGS. 5 and the exploded view of FIG. 6. With reference to FIG. 5, the central web 20 forming a portion of the rigid casting, is provided with protruding bosses 44 and 46, which include heavy duty bearings for accurately and firmly mounting the shaft 48 upon which the rotor of the motor 26 and the disks 34 are mounted. Incidentally, the hub 50 upon which the disks are mounted is hollow in order to accommodate the downwardly protruding boss 46 in which the shaft 48 is mounted. This configuration whereby the disks 34 are in part mounted around the outside of the support 46 contributes to the compactness of the unit.

As best seen in FIG. 6, the hub 50 has around its periphery a plurality of longitudinally extending grooves or recesses 52. Adjacent the web 20 separating the upper and lower compartments of the unit, the hub 50 is provided with a radially extending rim or shoulder 54. The grooves 52 extend into the rim or shoulder of portion 54 and terminate in outwardly extending slots 56 which provide centrifugal pumping action adjacent one surface of the uppermost disk 34, as indicated by the arrow 58 as shown in FIG. 5. Air is admitted to the lower ends of the channels 52 by the openings 60 in the securing plate or washer 62. It may also be noted that the spacer members 64 and 66 which hold the disks 34 in their proper alligned parallel relationship, are also provided with radially extending slots 68 and 70, respectively. These additional slots provide further radial pumping action across the surface of the disks 34, as indicated by the arrows 72 between disks 34 in FIG. 5.

Now, considering the complete air flow pattern, pumping action is provided by the radial openings in the hub 50 and the two additional spacers 64 and 66. This centrifugal pumping action draws air in through the openings 60 in the end securing plate 62 and down the peripheral slots 52 in hub 50. As best shown in FIGS. 5 and 2, the filter duct 38 has a lip 76 which extends into proximity with the lowermost magnetic disk 34. Accordingly, the centrifugal pumping action draws air through the duct 38 and through the filter element 36, and air drawn through the duct also passes out through the space between rim 76 and across the adjacent surface of one of the disks 34. The filter element within filter 36 is made of very fine filter paper folded back and forth to provide an extensive area. The filter paper blocks all particles which have a diameter greater than about 0.3 microns or about 12 millionths of an inch. The edges of the filter element are secured or bonded into position within the filter housing 78 by a thick layer of adhesive/sealant 80. With this arrangement, the clean zone 22 below the partition or web 20 is provided with an ultra-clean low pressure area within the duct 38, and it is this ultraclean air which is circulated through the hub 50 and radially outwardly across the surfaces of the magnetic disks 34. It is noted in passing that the entire filtering system and duct work 36, 38 are combined in a single light weight removable plastic structure, avoiding the need to include ducting in the casting, and maximizing compactness of the structure.

With this arrangement, the surfaces between the magnetic recording and pickup heads and the disks themselves are maintained entirely free of foreign particles which might introduce errors or impair the smooth operation of the magnetic heads adjacent the magnetic surfaces. It is also particularly to be noted that this is all done without the introduction of any substantial additional space being occupied by the filtering arrangements or ducting in the casting, and without the need for any auxiliary blower, such as is employed in some rigid magnetic disk units.

Incidentally, it may be noted that the filter assembly and duct 36 and 38 are secured to the lower closure plate 32 by the fasteners 84 which extend through outwardly directed flanges on the assembly 38 and are thus outside of the low pressure region defined by the duct. In this way, the possible leakages or contamination which could be associated with the fasteners 84 are not blown through and across the surface of the disks 34.

This invention is closely related to U.S. patent application Ser. No. 063,856, filed Aug. 6, 1979 and assigned to the assignee of this case.

Concerning dimensions and specifications, each of the disks is 200 mm or 7.87 inches in diameter, and the overall size of the unit is 14.3" (363 mm) deep, 8.55" wide (217 mm), and 4.62" (117 mm) high. The unit has a weight of 10 kilograms or 22 pounds. The spindle speed is 3600 rpm, and the track density is 478 tracks per inch. There are 580 available tracks on a single disk surface. Using a special Micropolis coding scheme, the number of eight bit bytes which may be encoded per track is 15,475, corresponding to 8.975 million bytes per surface, or 44.87 million bytes total, using a three disk unit with one of the six available surfaces being dedicated to head positioning through servo control.

It is to be understood that the specific embodiment shown and described hereinabove is merely illustrative of the principles of the invention. Thus, by way of example and not of limitation, instead of using three disks, a greater or lesser number could be employed, other filter structures could be employed, and the mechanical arrangements for implementing the centrifugal flow and other functions as described hereinabove could be varied from those which have been illustrated. Accordingly, the present invention is not to be considered limited to that precisely as shown herein.

What is claimed is:

1. A compact, high capacity, rigid magnetic disk digital storage system comprising:
    a deck formed principally of a single casting, having first section and a second clean zone section separated by a central cast web or partition;
    a disk drive motor;
    a plurality of active input and output electronic components including at least one printed circuit board;
    means for mounting said motor and said active electronic components in said first section;
    a plurality of rigid magnetic disks;
    a plurality of heads movably mounted for reading and writing digital information on said magnetic disks;
    means for mounting said disks in stacked spaced relationship for rotation by said motor within said second clean zone section;
    means for directing air outwardly across both of the surfaces of each of said magnetic disks, said air directing means including centrifugal pumping means mounted directly radially inwardly from said disks, said air directing and said pumping means including a central hub having a plurality of spaced peripheral slots, open at the end of said hub facing away from said motor, and a plurality of annular spacer rings mounted between said disks and around said hub, said annular spacer rings also being provided with radially extending openings aligned with the slots in said hub to draw air from the end of said hub down through said slots and out across the surfaces of said disks as a result of the centrifugal pumping action of said rotating spacer rings and disks; and
    filter assembly means including a housing defining an ultraclean low pressure zone, said housing extending over and closely fitting around the openings at the end of said hub, and said housing being of relatively shallow extent in the direction extending along the axis of said hub and said disks, and broad area filtering material defining the other limit of said low pressure ultra-clean zone, said filtering material being mounted in an enlarged portion of said filter housing spaced to one side of said disks, to complete the air circulation path within said second clean zone section of said system.

2. A compact high capacity digital storage system as defined in claim 1 including means for mounting components in said second clean zone section which have a combined mean time between failure greater than 20,000 hours.

3. A compact high capacity digital storage system as defined in claim 1 wherein said filter assembly includes means for blocking the passage of all particles having a diameter greater than one micron.

4. A compact, high capacity, rigid magnetic disk digital storage system comprising:
    a frame unit for supporting and housing said system including a first section and a second closed clean zone section, said sections being separated by a central web or partition;
    a disk drive motor;
    a plurality of active input and output electronic components;
    means for mounting said motor and said active electronic components in said first section;
    a plurality of rigid magnetic disks;
    a plurality of heads movably mounted for reading and writing digital information on said magnetic disks;
    means for mounting said disks in stacked spaced relationship for rotation by said motor within said second clean zone section;
    means for directing air outwardly across the surfaces of each of said magnetic disks, said air directing means including centrifugal pumping means mounted directly radially inwardly from said disks, said air directing and said pumping means including a central hub and spacer unit having passageway means opening to the space beyond the end of said hub and spacer unit facing away from said motor, and said hub and spacer unit also being provided with radially extending opening means aligned with the spaces between said disks to draw air from the end of said hub up through said passageway means and out across the surfaces of said disks as a result of the centrifugal pumping action of said rotating hub and spacer unit and disks; and
    filter assembly means including a housing defining an ultra-clean low pressure zone, said housing extending over and closely fitting around the passageway opening at the end of said hub, and said housing being of relatively shallow extent in the direction extending along the axis of said hub and said disks, and broad area filtering material defining the other limit of said low pressure ultra-clean zone, said filtering material being mounted in an enlarged portion of said filter housing spaced to one side of said disks, to complete the air circulation path within said second clean zone section of said system without significantly adding to the extent of said frame unit in the direction along the axis of said disks and said motor.

5. A compact, high capacity, rigid magnetic disk digital storage system as defined in claim 4 including means for mounting components in said second clean-zone section which have a combined mean time between failure which exceeds twenty-five thousand hours, and means for mounting components of said system mounted in said first section which have a combined mean time before failure of less than twenty-five thousand hours.

6. A compact high capacity digital storage system as defined in claim 4 wherein said filter assembly includes means for blocking the passage of all particles having a diameter greater than 0.5 microns.

7. A compact high capacity storage system as defined in claim 4 wherein said disks are approximately eight inches in diameter and wherein said frame unit is less than five inches in height.

8. A compact high capacity storage system as defined in claim 4 wherein said disks are approximately eight inches in diameter and wherein frame unit is less than four and three-quarters inches in height.

9. A compact, high capacity, rigid magnetic disk digital storage system comprising:
   a deck formed principally of a single casting, having first section and a second clean zone section separated by a central cast web or partition;
   a disk drive motor;
   a plurality of active input and output electronic components including at least one printed circuit board;
   means for mounting said motor and said active electronic components in said first section;
   a plurality of rigid magnetic disks;
   a plurality of heads movably mounted for reading and writing digital information on said magnetic disks;
   means for mounting said disks in stacked spaced relationship for rotation by said motor within said second clean zone section;
   means for directing air outwardly across the both surfaces of each of said magnetic disks, said air directing means including a central hub having a plurality of spaced peripheral slots, open at the end of said hub facing away from said motor, and a plurality of annular spacer rings mounted between said disks and around said hub, said annular spacer rings also being provided with radially extending openings aligned with the slots in said hub to draw air from the end of said hub down through said slots and out across the surfaces of said disks as a result of the centrifugal pumping action of said rotating spacer rings and disks;
   filter assembly means including a housing defining an ultraclean low Pressure zone, said housing extending over and closely fitting around the openings at the end of said hub, and said housing being of relatively shallow extent in the direction extending along the axis of said hub and said disks, and broad area filtering material defining the other limit of said low pressure ultra-clean zone, said filtering material being mounted in an enlarged portion of said filter housing spaced to one side of said disks, to complete the air circulation path within said second clean zone section of said system;
   a second printed circuit board connected across an opening in said central cast web;
   preamplifier means mounted in sockets on said printed circuit board in the first section; and
   means located in said second clean zone section for connecting said heads directly to said printed circuit board for the amplification by said preamplifier means of the digital signals read from said disks.

10. A compact, high capacity, rigid magnetic disk digital storage system comprising:
    a deck formed principally of a single casting, having first section and a second clean zone section separated by a central cast web or partition;
    a disk drive motor;
    a plurality of active input and output electronic components including at least one printed circuit board;
    means for mounting said motor and said active electronic components in said first section;
    a plurality of rigid magnetic disks;
    a plurality of heads movably mounted for reading and writing digital information on said magnetic disks;
    means for mounting said disks in stacked spaced relationship for rotation by said motor within said second clean zone section;
    means for directing air outwardly across the both surfaces of each of said magnetic disks, said air directing means including a central hub having a plurality of spaced peripheral slots, open at the end of said hub facing away from said motor, and a plurality of annular spacer rings mounted between said disks and around said hub, said annular spacer rings also being provided with radially extending openings aligned with the slots in said hub to draw air from the end of said hub down through said slots and out across the surfaces of said disks as a result of the centrifugal pumping action of said rotating spacer rings and disks;
    filter assembly means including a housing defining an ultraclean low Pressure zone, said housing extending over and closely fitting around the openings at the end of said hub, and said housing being of relatively shallow extent in the direction extending along the axis of said hub and said disks, and broad area filtering material defining the other limit of said low pressure ultra-clean zone, said filtering material being mounted in an enlarged portion of said filter housing spaced to one side of said disks, to complete the air circulation path within said second clean zone section of said system;
    said web or partition including rigid bosses extending into said first and second sections; and
    said hub being hollow and constituting means for mounting said disks to rotate around the boss which extends into said second section of said deck.

11. A compact, high capacity, rigid magnetic disk digital storage system comprising:
    a deck formed principally of a single casting, having first section and a second clean zone section separated by a central cast web or partition;
    a disk drive motor;
    a plurality of active input and output electronic components including at least one printed circuit board;
    means for mounting said motor and said active electronic components in said first section;
    a plurality of rigid magnetic disks;
    a plurality of heads movably mounted for reading and writing digital information on said magnetic disks;
    means for mounting said disks in stacked spaced relationship for rotation by said motor within said second clean zone section;
    means for directing air outwardly across the both surfaces of each of said magnetic disks, said air directing means including a central hub having a plurality of spaced peripheral slots, open at the end of said hub facing away from said motor, and a plurality of annular spacer rings mounted between said disks and around said hub, said annular spacer rings also being provided with radially extending openings aligned with the slots in said hub to draw air from the end of said hub down through said slots and out across the surfaces of said disks as a result of the centrifugal pumping action of said rotating spacer rings and disks;

filter assembly means including a housing defining an ultraclean low Pressure zone, said housing extending over and closely fitting around the openings at the end of said hub, and said housing being of relatively shallow extent in the direction extending along the axis of said hub and said disks, and broad area filtering material defining the other limit of said low pressure ultra-clean zone, said filtering material being mounted in an enlarged portion of said filter housing spaced to one side of said disks, to complete the air circulation path within said second clean zone section of said system;

said second clean zone section being generally rectangular in configuration, said plurality of disks being mounted for rotation at one end thereof; and said filter being mounted in a corner of said second section at the opposite end from said disks.

12. A compact, high capacity, rigid magnetic disk digital storage system comprising:

a deck formed principally of a single casting, having first section and a second clean zone section separated by a central cast web or partition;

a disk drive motor;

a plurality of active input and output electronic components including at least one printed circuit board;

means for mounting said motor and said active electronic components in said first section;

a plurality of rigid magnetic disks;

a plurality of heads movably mounted for reading and writing digital information on said magnetic disks;

means for mounting said disks in stacked spaced relationship for rotation by said motor within said second clean zone section;

means for directing air outwardly across the both surfaces of each of said magnetic disks, said air directing means including a central hub having a plurality of spaced peripheral slots, open at the end of said hub facing away from said motor, and a plurality of annular spacer rings mounted between said disks and around said hub, said annular spacer rings also being provided with radially extending openings aligned with the slots in said hub to draw air from the end of said hub down through said slots and out across the surfaces of said disks as a result of the centrifugal pumping action of said rotating spacer rings and disks;

filter assembly means including a housing defining an ultraclean low Pressure zone, said housing extending over and closely fitting around the openings at the end of said hub, and said housing being of relatively shallow extent in the direction extending along the axis of said hub and said disks, and broad area filtering material defining the other limit of said low pressure ultra-clean zone, said filtering material being mounted in an enlarged portion of said filter housing spaced to one side of said disks, to complete the air circulation path within said second clean zone section of said system; and said filtering assembly including the entire air filtering system and duct work being combined into a single lightweight removable structure, thereby maximizing the compactness of the design.

13. A compact, high capacity, rigid magnetic disk digital storage system comprising:

a frame unit for supporting and housing said system including a first section and a second closed clean zone section, said sections being separated by a central web or partition;

a disk drive motor;

a plurality of active input and output electronic components;

means for mounting said motor and said active electonic components in said first section;

a plurality of rigid magnetic disks;

a plurality of heads movably mounted for reading and writing digital information on said magnetic disks;

means for mounting said disks in stacked spaced relationship for rotation by said motor within said second clean zone section;

means for directing air outwardly across the surfaces of each of said magnetic disks, said air directing means including a central hub and spacer unit having passageway means opening to the space beyond the end of said hub and spacer unit facing away from said motor, and said hub and spacer unit also being provided with radially extending opening means aligned with the spaces between said disks to draw air from the end of said hub up through said passageway means and out across the surfaces of said disks as a result of the centrifugal pumping action of said rotating hub and spacer unit and disks;

filter assembly means including a housing defining an ultra-clean low pressure zone, said housing extending over and closely fitting around the passageway opening at the end of said hub, and said housing being of relatively shallow extent in the direction extending along the axis of said hub and said disks, and broad area filtering material defining the other limit of said low pressure ultra-clean zone, said filtering material being mounted in an enlarged portion of said filter housing spaced to one side of said disks, to complete the air circulation path within said second clean zone section of said system without significantly adding to the extent of said frame unit in the direction along the axis of said disks and said motor;

a printed circuit board connected across an opening in said central partition;

preamplifier means mounted in sockets on said printed circuit board in the first section; and means located in said second clean zone section for connecting said heads directly to said printed circuit board for the amplification by said preamplifier means of the digital signals read from said disks.

14. A compact, high capacity, rigid magnetic disk digital storage system comprising:

a frame unit for supporting and housing said system including a first section and a second closed clean zone section, said sections being separated by a central web or partition;

a disk drive motor;

a plurality of active input and output electronic components;

means for mounting said motor and said active electonic components in said first section;

a plurality of rigid magnetic disks;

a plurality of heads movably mounted for reading and writing digital information on said magnetic disks;

means for mounting said disks in stacked spaced relationship for rotation by said motor within said second clean zone section;

means for directing air outwardly across the surfaces of each of said magnetic disks, said air directing means including a central hub and spacer unit having passageway means opening to the space beyond the end of said hub and spacer unit facing away from said motor, and said hub and spacer unit also being provided with radially extending opening means aligned with the spaces between said disks to draw air from the end of said hub up through said passageway means and out across the surfaces of said disks as a result of the centrifugal pumping action of said rotating hub and spacer unit and disks;

filter assembly means including a housing defining an ultra-clean low pressure zone, said housing extending over and closely fitting around the passageway opening at the end of said hub, and said housing being of relatively shallow extent in the direction extending along the axis of said hub and said disks, and broad area filtering material defining the other limit of said low pressure ultra-clean zone, said filtering material being mounted in an enlarged portion of said filter housing spaced to one side of said disks, to complete the air circulation path within said second clean zone section of said system without significantly adding to the extent of said frame unit in the direction along the axis of said disks and said motor;

said web or partition including rigid bosses extending into said first and second sections; and said hub and spacer unit being hollow and constituting means for mounting said disks to rotate around the boss which extends into said second section of said deck.

15. A compact, high capacity, rigid magnetic disk digital storage system comprising:

a frame unit for supporting and housing said system including a first section and a second closed clean zone section, said sections being separated by a central web or partition;

a disk drive motor;

a plurality of active input and output electronic components;

means for mounting said motor and said active electonic components in said first section;

a plurality of rigid magnetic disks;

a plurality of heads movably mounted for reading and writing digital information on said magnetic disks;

means for mounting said disks in stacked spaced relationship for rotation by said motor within said second clean zone section;

means for directing air outwardly across the surfaces of each of said magnetic disks, said air directing means including a central hub and spacer unit having passageway means opening to the space beyond the end of said hub and spacer unit facing away from said motor, and said hub and spacer unit also being provided with radially extending opening means aligned with the spaces between said disks to draw air from the end of said hub up through said passageway means and out across the surfaces of said disks as a result of the centrifugal pumping action of said rotating hub and spacer unit and disks;

filter assembly means including a housing defining an ultra-clean low pressure zone, said housing extending over and closely fitting around the passageway opening at the end of said hub, and said housing being of relatively shallow extent in the direction extending along the axis of said hub and said disks, and broad area filtering material defining the other limit of said low pressure ultra-clean zone, said filtering material being mounted in an enlarged portion of said filter housing spaced to one side of said disks, to complete the air circulation path within said second clean zone section of said system without significantly adding to the extent of said frame unit in the direction along the axis of said disks and said motor;

said second clean zone section being generally rectangular in configuration, said plurality of disks being mounted for rotation at one end thereof; and said filter being mounted in a corner of said second section at the opposite end from said disks.

16. A compact, high capacity, rigid magnetic disk digital storage system comprising:

a frame unit for supporting and housing said system including a first section and a second closed clean zone section, said sections being separated by a central web or partition;

a disk drive motor;

a plurality of active input and output electronic components;

means for mounting said motor and said active electonic components in said first section;

a plurality of rigid magnetic disks;

a plurality of heads movably mounted for reading and writing digital information on said magnetic disks;

means for mounting said disks in stacked spaced relationship for rotation by said motor within said second clean zone section;

means for directing air outwardly across the surfaces of each of said magnetic disks, said air directing means including a central hub and spacer unit having passageway means opening to the space beyond the end of said hub and spacer unit facing away from said motor, and said hub and spacer unit also being provided with radially extending opening means aligned with the spaces between said disks to draw air from the end of said hub up through said passageway means and out across the surfaces of said disks as a result of the centrifugal pumping action of said rotating hub and spacer unit and disks;

filter assembly means including a housing defining an ultra-clean low pressure zone, said housing extending over and closely fitting around the passageway opening at the end of said hub, and said housing being of relatively shallow extent in the direction extending along the axis of said hub and said disks, and broad area filtering material defining the other limit of said low pressure ultra-clean zone, said filtering material being mounted in an enlarged portion of said filter housing spaced to one side of said disks, to complete the air circulation path within said second clean zone section of said system without significantly adding to the extent of said frame unit in the direction along the axis of said disks and said motor; and said filtering assembly including the entire air filtering system and duct work being combined into a single lightweight removable structure, thereby maximizing the compactness of the design.

* * * * *